US012746419B2

(12) United States Patent
B. et al.

(10) Patent No.: US 12,746,419 B2
(45) Date of Patent: Sep. 29, 2026

(54) LOW FOOTPRINT ENERGY STORAGE SYSTEM INSTALLATION

(71) Applicant: Caterpillar Inc., Peoria, IL (US)

(72) Inventors: Vimal B., Chennai (IN); Sampath Kumar Nachimuthu, Bangalore (IN); Prakash Prashanth Ravi, Bengaluru (IN); Krishna Prasath Ramabadhran, Krishnagiri (IN); Chethan Ramakrishnaiah, Bengaluru (IN); Kishore M., Bengaluru (IN)

(73) Assignee: Caterpillar Inc., Peoria, IL (US)

(*) Notice: Subject to any disclaimer, the term of this patent is extended or adjusted under 35 U.S.C. 154(b) by 180 days.

(21) Appl. No.: 18/733,944

(22) Filed: Jun. 5, 2024

(65) Prior Publication Data

US 2025/0375636 A1 Dec. 11, 2025

(51) Int. Cl.
*A62C 3/16* (2006.01)
*G08B 17/10* (2006.01)
(Continued)

(52) U.S. Cl.
CPC ................ *A62C 3/16* (2013.01); *G08B 17/10* (2013.01); *G08B 25/12* (2013.01); (Continued)

(58) Field of Classification Search
None
See application file for complete search history.

(56) References Cited

U.S. PATENT DOCUMENTS 3,668,682 A 6/1972 Barbee et al.
4,523,681 A 6/1985 Kreeger
(Continued)

FOREIGN PATENT DOCUMENTS

CN 103977516 B 3/2017
CN 111467715 A 7/2020
(Continued)

OTHER PUBLICATIONS

Written Opinion and International Search Report for Int'l. Patent Appln. No. PCT/US2025/030792, mailed Sep. 11, 2025 (88 pgs).

*Primary Examiner* — John F Mortell
(74) *Attorney, Agent, or Firm* — ConcurIP

(57) ABSTRACT

A low footprint energy storage system installation includes a plurality of energy storage systems arranged in a stacked configuration to reduce a footprint of installation, and an indication system externally disposed relative to the plurality of energy storage systems. The indication system includes a housing, a fire alarm device, a discharge alarm device, and a panel assembly at least partially disposed in the housing and including an annunciation panel. The indication system includes a controller at least partially disposed in the housing and in communication with each of the plurality of energy storage systems, the fire alarm device, the discharge alarm device, and the panel assembly. The low footprint energy storage system installation further includes a thermal management system and a fire suppressing system communicably coupled with the controller of the indication system and in fluid communication with each of the plurality of energy storage systems.

20 Claims, 9 Drawing Sheets

(51) Int. Cl.

| | |
|---|---|
| ***G08B 25/12*** | (2006.01) |
| ***H01M 10/60*** | (2014.01) |
| ***H01M 10/615*** | (2014.01) |
| ***H01M 10/63*** | (2014.01) |
| *A62C 3/06* | (2006.01) |

(52) U.S. Cl.

CPC ......... *H01M 10/615* (2015.04); *H01M 10/63* (2015.04); *A62C 3/06* (2013.01)

(56) References Cited

U.S. PATENT DOCUMENTS

| | | | | |
|---|---|---|---|---|
| 11,900,788 | B1 | 2/2024 | Zwirn | |
| 12,021,272 | B2 * | 6/2024 | Griffin | H01M 10/657 |
| 12,166,233 | B2 * | 12/2024 | Ryder | H01M 10/486 |
| 2021/0299491 | A1 * | 9/2021 | Adiga | H01M 50/244 |
| 2024/0128758 | A1 * | 4/2024 | Bellows | H02J 3/32 |
| 2024/0204297 | A1 * | 6/2024 | Eller | H01M 50/249 |

FOREIGN PATENT DOCUMENTS

| | | | |
|---|---|---|---|
| CN | 212303765 | | 1/2021 |
| CN | 110690513 | B | 7/2021 |
| CN | 113521608 | A | 10/2021 |
| CN | 117180664 | A | 12/2023 |
| DE | 4402219 | | 7/1995 |
| EP | 2703917 | | 8/2016 |
| EP | 4302287 | A1 | 1/2024 |
| JP | 2005239359 | A | 9/2005 |
| WO | 2016054724 | | 4/2016 |

* cited by examiner

LOW FOOTPRINT ENERGY STORAGE SYSTEM INSTALLATION

TECHNICAL FIELD

The present disclosure relates to a low footprint energy storage system installation, an indication system for a plurality of energy storage systems, and an indication method for the plurality of energy storage systems.

BACKGROUND

An energy storage installation site includes a number of energy storage systems that may store electrical energy received from an external system, such as, a power grid. The energy storage systems may supply the stored electrical energy for various residential, commercial, and/or industrial applications. Currently, the energy storage systems are arranged such that an arrangement of the energy storage systems increases a footprint of the energy storage installation site thus, providing lesser energy density per area.

Further, each energy storage system includes a thermal management system that maintains a temperature of the energy storage system within a predetermined temperature range. The thermal management system of each energy storage system is arranged proximal to the corresponding energy storage system and thus requires an additional space and mounting provisions for installation.

Furthermore, each energy storage system includes a fire suppressing system that supplies a fire suppressing agent to the energy storage system in case of an occurrence of more than one fire event. The fire event may include activation of one or more sensing elements that are adapted to detect smoke, heat, radiant energy, other fire event detection signature, or manual stop. The fire suppressing system of each energy storage system is arranged proximal to the corresponding energy storage system and thus requires an additional space and mounting provisions for installation. Thus, each energy storage system includes a dedicated thermal management system and a dedicated fire suppressing system.

Moreover, each energy storage system includes one or more dedicated fire alarm components. The fire alarm components may include, for example, a fire alarm that indicates the occurrence of a fire event in the corresponding energy storage system, a discharge alarm that indicates a release event of the fire suppressing agent in case of detection of more than one fire event, a manual pull station, a disable switch for disconnecting an electrical circuit of the corresponding energy storage system, and the like. Further, each energy storage system may require a monitor module that receives one or more inputs and accordingly activates one or more of the fire alarm components. Such dedicated fire alarm components may increase a complexity of the energy storage system as each energy storage system requires provisions to mount the fire alarm components on the energy storage system.

Further, each energy storage system may require provisions to run cables from inside the energy storage system to each fire alarm component. Furthermore, each energy storage system may require adequate sealing devices to prevent the fire alarm components from dust, water, and the like.

Moreover, manually pressing the manual pull station of the energy storage system may be impractical in case of fire events. Further, when multiple energy storage systems are arranged together, it may be difficult to identify the energy storage system in which the fire alarm and/or the discharge alarm has triggered. It is further difficult to access the disable switch to disconnect the electrical circuit of the energy storage system if the disable switch is disposed inside the energy storage system.

Overall, the dedicated thermal management system, the dedicated fire suppressing system, and the dedicated fire alarm components may increase the footprint of the energy storage installation site. Further, the dedicated thermal management system, the dedicated fire suppressing system, and the dedicated fire alarm components may increase maintenance efforts and costs, may increase part numbers associated with the energy storage installation site, may increase operating costs of the energy storage installation site, and may complicate a design of the energy storage system as well as the energy storage installation site.

WO2022185079A1 describes an emergency call device (ECD) that can be fitted into pre-programmed fire detection zones of a building. During an emergency, occupants are prompted to press a button on a nearby ECD, indicating to a controller the occupants presence at that location.

SUMMARY OF THE DISCLOSURE

In an aspect of the present disclosure, a low footprint energy storage system installation is provided. The low footprint energy storage system installation includes a plurality of energy storage systems. The low footprint energy storage system installation also includes an indication system externally disposed relative to the plurality of energy storage systems. The indication system includes a housing. The indication system also includes a fire alarm device at least partially disposed in the housing and configured to generate a first alarm indicative of a fire event detected in at least one of the plurality of energy storage systems. The indication system further includes a discharge alarm device at least partially disposed in the housing and configured to generate a second alarm indicative of a post fire suppressing agent release event of a fire suppressing agent into a detected energy storage system from the plurality of energy storage systems. The post fire suppressing agent release event occurs when more than one fire event is detected in at least one of the plurality of energy storage systems. The indication system includes a panel assembly at least partially disposed in the housing and including an annunciation panel. The annunciation panel is configured to generate a visual indication of the fire event detected in at least one of the plurality of energy storage systems, the post fire suppressing agent release event of the fire suppressing agent into the detected energy storage system from the plurality of energy storage systems, a faulty operation in at least one of the plurality of energy storage systems, and/or a gas detection event in at least one of the plurality of energy storage systems. The indication system includes a controller at least partially disposed in the housing and in communication with each of the plurality of energy storage systems, the fire alarm device, the discharge alarm device, and the panel assembly. The controller is configured to receive, from at least one of the plurality of energy storage systems, at least one of a first information indicative of the fire event detected in at least one of the plurality of energy storage systems, a second information indicative of the post fire suppressing agent release event of the fire suppressing agent into the detected energy storage system from the plurality of energy storage systems, a third information indicative of the faulty operation in at least one of the plurality of energy storage systems, and/or a fourth information indicative of the gas detection event in at least one of the plurality of energy storage systems. The controller is also configured to activate the fire alarm device to generate the first alarm upon receiving the first information. The controller is further configured to activate the discharge alarm device to generate the second alarm upon receiving the second information. The controller is configured to generate, via the annunciation panel, the visual indication upon receiving at least one of the first information, the second information, the third information, and/or the fourth information. The low footprint energy storage system installation further includes a thermal management system in fluid communication with each of the plurality of energy storage systems and configured to maintain a temperature of each of the plurality of energy storage systems within a predetermined temperature range. The low footprint energy storage system installation includes a fire suppressing system communicably coupled with the controller of the indication system and in fluid communication with each of the plurality of energy storage systems. Upon receiving the second information from the detected energy storage system from the plurality of energy storage systems, the controller is configured to transmit a control signal with a pre-determined fire suppressing agent release time to the fire suppressing system. Upon receiving the control signal, the fire suppressing system is configured to supply the fire suppressing agent towards the detected energy storage system from the plurality of energy storage systems.

In another aspect of the present disclosure, an indication system for a plurality of energy storage systems is provided. The indication system includes a housing. The indication system also includes a fire alarm device at least partially disposed in the housing and configured to generate a first alarm indicative of a fire event detected in at least one of the plurality of energy storage systems. The indication system further includes a discharge alarm device at least partially disposed in the housing and configured to generate a second alarm indicative of a post fire suppressing agent release event of a fire suppressing agent into a detected energy storage system from the plurality of energy storage systems. The post fire suppressing agent release event occurs when more than one fire event is detected in at least one of the plurality of energy storage systems. The indication system includes a panel assembly at least partially disposed in the housing and including an annunciation panel. The annunciation panel is configured to generate a visual indication of at least one of the fire event detected in at least one of the plurality of energy storage systems, the post fire suppressing agent release event of the fire suppressing agent into the detected energy storage system from the plurality of energy storage systems, a faulty operation in at least one of the plurality of energy storage systems, and/or a gas detection event in at least one of the plurality of energy storage systems. The indication system also includes a controller at least partially disposed in the housing and in communication with each of the plurality of energy storage systems, the fire alarm device, the discharge alarm device, and the panel assembly. The controller is configured to receive, from at least one of the plurality of energy storage systems, at least one of a first information indicative of the fire event detected in at least one of the plurality of energy storage systems, a second information indicative of the post fire suppressing agent release event of the fire suppressing agent into the detected energy storage system from the plurality of energy storage systems, a third information indicative of the faulty operation in at least one of the plurality of energy storage systems, and/or a fourth information indicative of the gas detection event in at least one of the plurality of energy storage systems. The controller is also configured to activate the fire alarm device to generate the first alarm upon receiving the first information. The controller is further configured to activate the discharge alarm device to generate the second alarm upon receiving the second information. The controller is configured to generate, via the annunciation panel, the visual indication upon receiving at least one of the first information, the second information, the third information, and/or the fourth information.

In yet another aspect of the present disclosure, an indication method for a plurality of energy storage systems is provided. The indication method includes receiving, by a controller of an indication system, at least one of a first information indicative of a fire event detected in at least one of the plurality of energy storage systems, a second information indicative of a post fire suppressing agent release event of a fire suppressing agent into a detected energy storage system from the plurality of energy storage systems, a third information indicative of a faulty operation in at least one of the plurality of energy storage systems, and/or a fourth information indicative of a gas detection event in at least one of the plurality of energy storage systems. The post fire suppressing agent release event occurs when more than one fire event is detected in at least one of the plurality of energy storage systems. The indication method also includes activating, by the controller, a fire alarm device of the indication system to generate a first alarm upon receiving the first information. The first alarm is indicative of the fire event detected in at least one of the plurality of energy storage systems. The indication method further includes activating, by the controller, a discharge alarm device of the indication system to generate a second alarm upon receiving the second information. The second alarm is indicative of the post fire suppressing agent release event of the fire suppressing agent into the detected energy storage system from the plurality of energy storage systems. The indication method includes generating, by the controller, a visual indication on an annunciation panel of the indication system upon receiving at least one of the first information, the second information, the third information, and/or the fourth information. The visual indication is indicative of at least one of the fire event detected in at least one of the plurality of energy storage systems, the post fire suppressing agent release event of the fire suppressing agent into the detected energy storage system from the plurality of energy storage systems, the faulty operation in at least one of the plurality of energy storage systems, and/or the gas detection event in at least one of the plurality of energy storage systems.

Other features and aspects of this disclosure will be apparent from the following description and the accompanying drawings.

DETAILED DESCRIPTION

Wherever possible, the same reference numbers will be used throughout the drawings to refer to the same or like parts.

Figure 1:
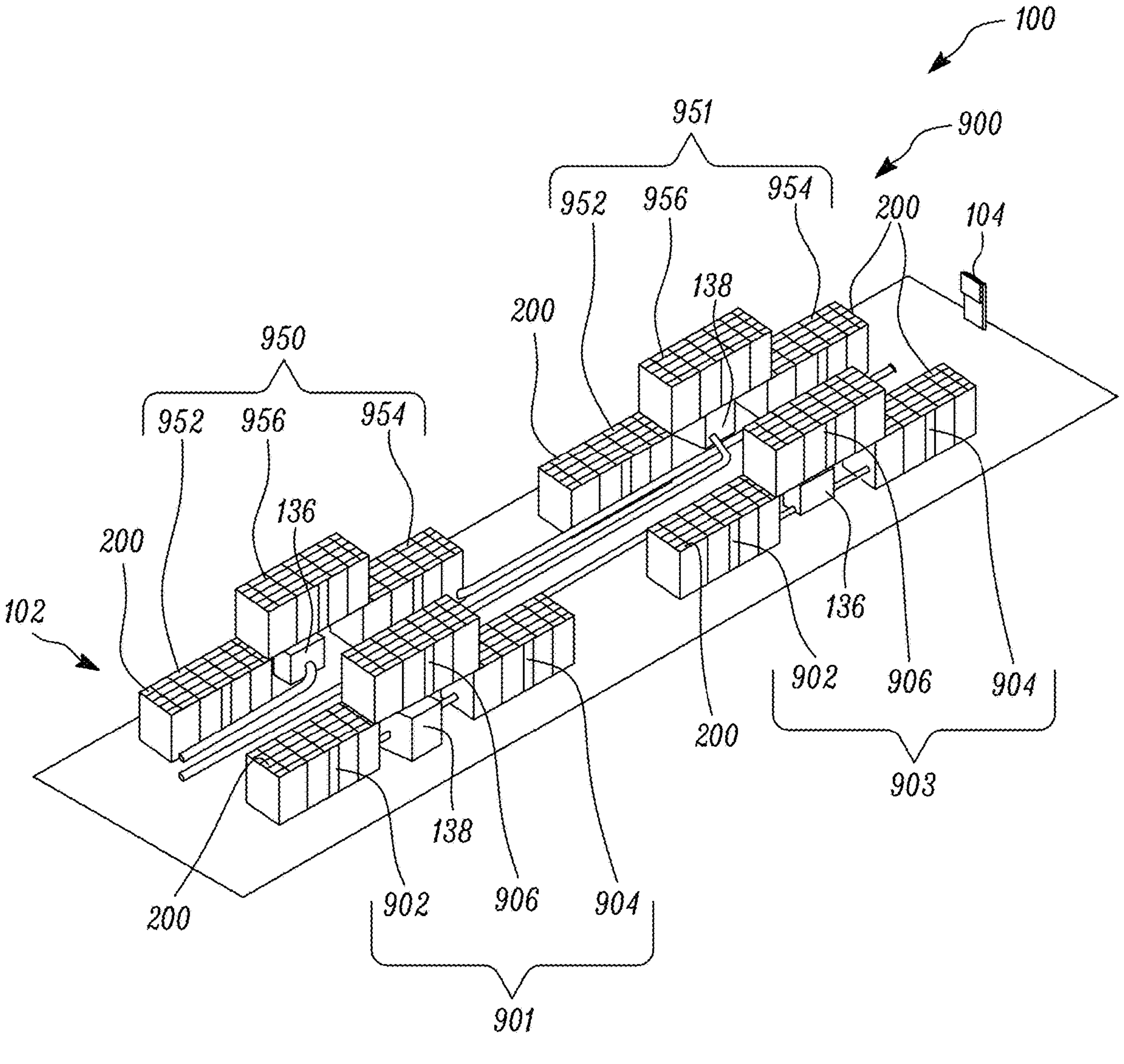
FIG. 1 is a schematic perspective view a low footprint energy storage system installation including an exemplary arrangement of the number of energy storage systems, according to an example of the present disclosure.

Referring to FIG. 1, a schematic perspective view of a low footprint energy storage system installation 100 is illustrated, according to an example of the present disclosure. The low footprint energy storage system installation 100 includes a number of energy storage systems 102. Specifically, the low footprint energy storage system installation 100 includes an arrangement 900 of the number of energy storage systems 102. In the illustrated example of FIG. 1, each energy storage system 102 is embodied as a battery energy storage system. Each energy storage system 102 includes one or more battery modules (not shown) that may store an electrical energy received from any known electrical system, for example, a power grid. Each energy storage system 102 may selectively direct the stored electrical energy for various residential, commercial, and/or industrial applications.

In some examples, each energy storage system 102 may have a different configuration and may be rated for a different power and energy capacity. In other examples, each energy storage system 102 may have a same configuration and may be rated for same power and energy capacity. Further, each energy storage system 102 may have a different state of charge or each energy storage system 102 may have the same state of charge.

Furthermore, each energy storage system 102 includes a system controller (not shown) that may determine a current state of power and a state of health of a corresponding energy storage system 102. Each energy storage system 102 may include one or more sensors (not shown), for example, a temperature sensor, a gas detection sensor, a fault detection sensor, a liquid sensor, and the like that are communicably coupled with the system controllers of each energy storage system 102.

Figure 2:
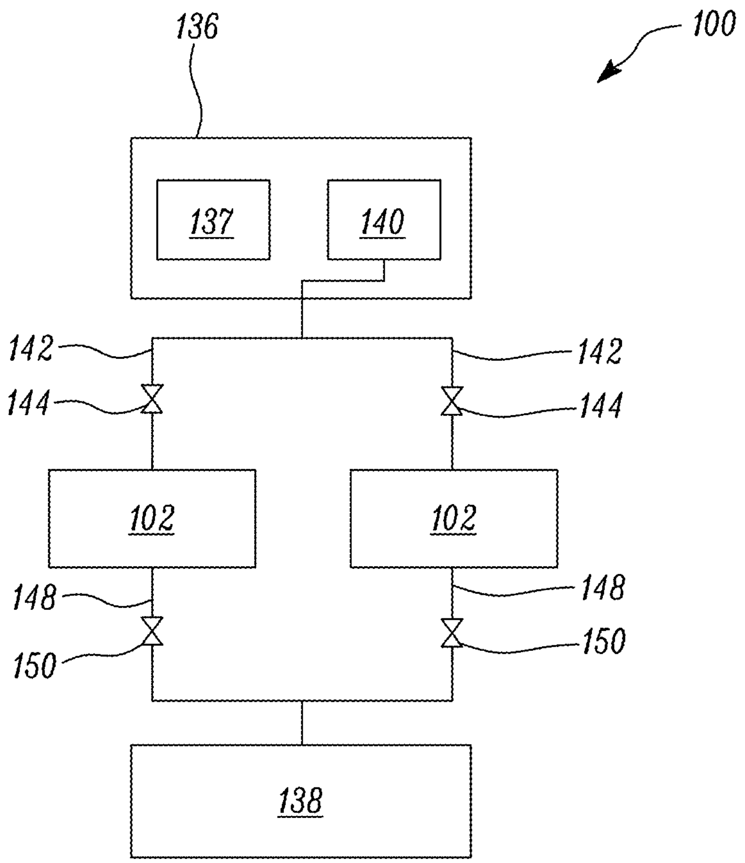
FIG. 2 is a schematic diagram of the low footprint energy storage system installation of FIG. 1 including a thermal management system and a fire suppressing system.

Referring now to FIG. 2, a schematic diagram of the low footprint energy storage system installation 100 of FIG. 1 is illustrated. As shown in FIG. 2, the low footprint energy storage system installation 100 also includes a thermal management system 136 in fluid communication with each of the number of energy storage systems 102. It should be noted that only two energy storage systems 102 are illustrated in FIG. 2 as an example. The thermal management system 136 maintains a temperature of each of the number of energy storage systems 102 within a predetermined temperature range.

The thermal management system 136 includes a coolant tank 140, a number of first fluid tubes 142, and a number of first valves 144 in fluid communication with the coolant tank 140. Each of the number of energy storage systems 102 is in fluid communication with the coolant tank 140 via a corresponding first fluid tube 142 and a corresponding first valve 144. In some examples, the first valve 144 may be a solenoid valve. In other examples, the first valve 144 may include any other type of valve based on requirements.

In an example, the thermal management system 136 may also include a thermal management controller 137 that may be communicably coupled with the system controller of each of the energy storage system 102. The thermal management controller 137 may receive a cooling requirement of the energy storage systems 102 from the system controller. Based on the cooling requirement of the energy storage systems 102, the thermal management controller 137 may control the first valve 144 to provide a coolant flow from the coolant tank 140 to the energy storage systems 102 via the corresponding first fluid tube 142 and the first valve 144 to maintain the temperature of the energy storage systems 102 within the predetermined temperature range.

Figure 3:
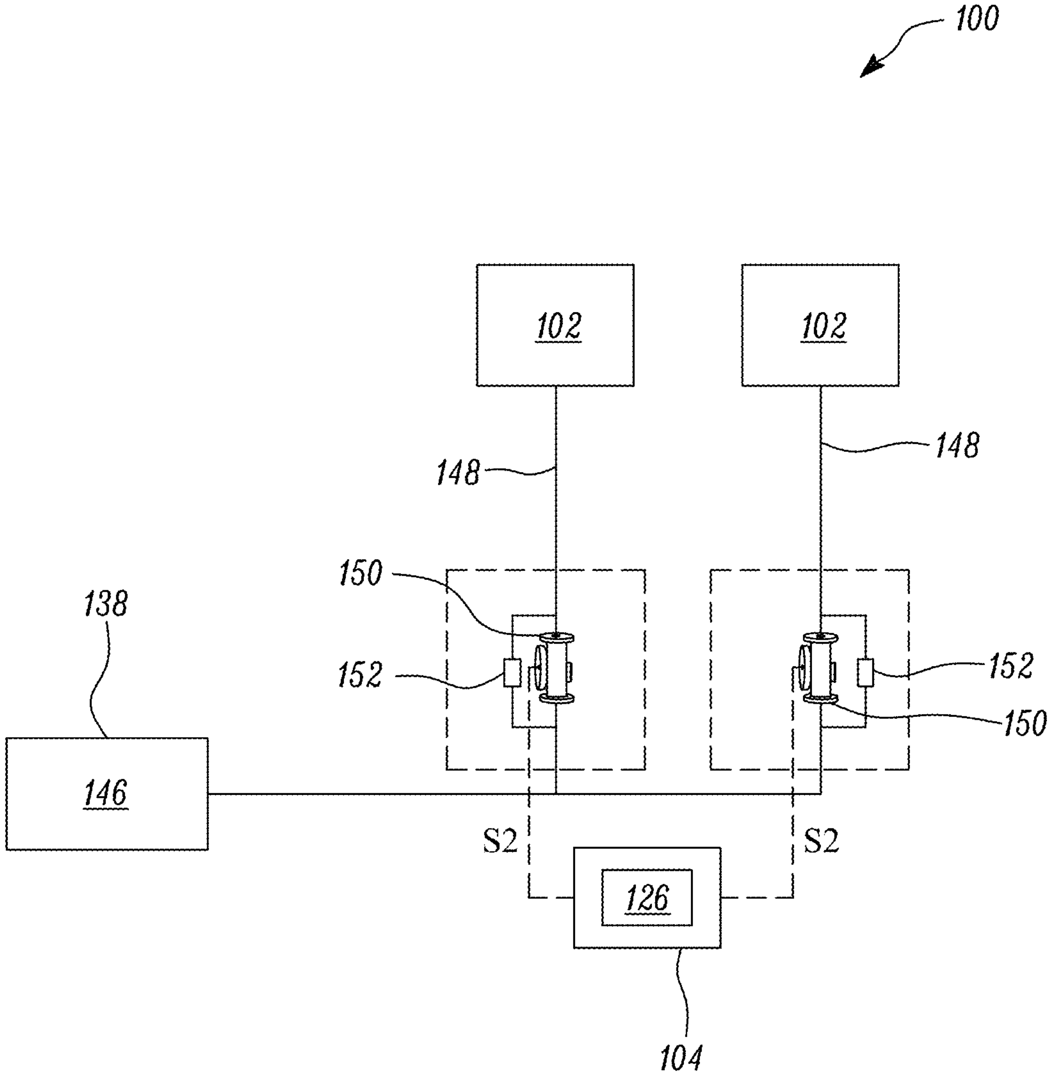
FIG. 3 is a schematic diagram of the fire suppressing system of FIG. 2 that is in fluid communication with the number of energy storage systems.

The low footprint energy storage system installation 100 further includes a fire suppressing system 138. Referring to FIG. 3, a schematic diagram of the fire suppressing system 138 in fluid communication with the number of energy storage systems 102 is illustrated. In the illustrated example of FIG. 3, only two energy storage systems 102 are illustrated as an example. In FIG. 3, fluid lines between two or more components are illustrated with solid lines and communication lines between two or more components are illustrated with dotted lines.

With reference to FIGS. 2 and 3, the fire suppressing system 138 is communicably coupled with a controller 126 (shown in FIGS. 5 and 7) of an indication system 104 (shown in FIG. 1). The fire suppressing system 138 is in fluid communication with each of the number of energy storage systems 102 (see FIGS. 1 and 5). Upon receiving a first information I1 (shown in FIG. 7) from one or more of the number of energy storage systems 102, the controller 126 transmits a control signal S2 with a pre-determined fire suppressing agent release time to the fire suppressing system 138. Upon receiving the control signal S2, the fire suppressing system 138 supplies a fire suppressing agent towards a detected energy storage system 102 from the number of energy storage systems 102. The term "detected energy storage system" as used in this disclosure is indicative of an energy storage system in which more than one fire event was detected.

The fire suppressing system 138 includes a fire suppressing agent tank 146, a number of second fluid tubes 148, and a number of second valves 150 in fluid communication with the fire suppressing agent tank 146. In some examples, the second valve 150 may be a solenoid valve. In other examples, the second valve 150 may include any other type of valve based on requirements.

Each of the number of energy storage systems 102 is in fluid communication with the fire suppressing agent tank 146 via a corresponding second fluid tube 148 and a corresponding second valve 150. Upon receiving the first information I1 from one or more of the number of energy storage systems 102, the controller 126 places the corresponding second valve 150 in an open state to supply the fire suppressing agent towards the corresponding energy storage system 102.

The fire suppressing system 138 further includes a bypass valve 152. The bypass valve 152 may be manually operated. When placed in an open state, the bypass valve 152 supplies the fire suppressing agent towards the corresponding energy storage system 102.

Referring again to FIG. 1, the number of energy storage systems 102 includes one or more first sets 901, 903 of energy storage systems 102. Specifically, in the illustrated example of FIG. 1, the number of energy storage systems 102 include two first sets 901, 903 of energy storage systems 102. Alternatively, any number of first sets 901, 903 of energy storage systems 102 may be arranged, as per application attributes.

The one or more first sets 901, 903 of energy storage systems 102 includes a first energy storage system 902, a second energy storage system 904 longitudinally spaced apart from the first energy storage system 902, and a third energy storage system 906 at least partially disposed atop each of the first energy storage system 902 and the second energy storage system 904. At least a portion of the thermal management system 136 and/or the fire suppressing system 138 is disposed between the first energy storage system 902 and the second energy storage systems 904. Specifically, the fire suppressing system 138 is disposed between the first energy storage system 902 and the second energy storage systems 904 of the first set 901 of energy storage systems 102 and the thermal management system 136 is disposed between the first energy storage system 902 and the second energy storage systems 904 of the first set 903 of energy storage systems 102.

The number of energy storage systems 102 also includes one or more second sets 950, 951 of energy storage systems 102 laterally spaced apart from the one or more first sets 901, 903 of energy storage systems 102. Specifically, in the illustrated example of FIG. 1, the number of energy storage systems 102 include two second sets 950, 951 of energy storage systems 102. Alternatively, any number of second sets 950, 951 of energy storage systems 102 may be arranged, as per application attributes.

The one or more second sets 950, 951 of energy storage systems 102 includes a first energy storage system 952, a second energy storage system 954 longitudinally spaced apart from the first energy storage system 952, and a third energy storage system 956 at least partially disposed atop each of the first energy storage system 952 and the second energy storage system 954.

At least a portion of other of the thermal management system 136 and/or the fire suppressing system 138 is disposed between the first energy storage systems 952 and the second energy storage system 954. Specifically, the thermal management system 136 is disposed between the first energy storage system 952 and the second energy storage systems 954 of the second set 950 of energy storage systems 102 and the fire suppressing system 138 is disposed between the first energy storage system 952 and the second energy storage systems 954 of the second set 951 of energy storage systems 102.

Figure 4:
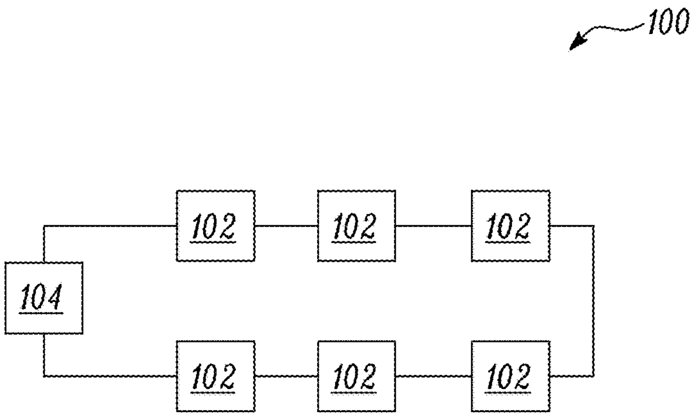
FIG. 4 is a schematic diagram of the low footprint energy storage system installation including a number of energy storage systems and an indication system for the number of energy storage systems, according to an example of the present disclosure.

The low footprint energy storage system installation 100 further includes the indication system 104. Referring to FIG. 4, a schematic diagram of the low footprint energy storage system installation 100 of FIG. 1 including the number of energy storage systems 102 and the indication system 104 is illustrated. In the illustrated example of FIG. 4, only six energy storage systems 102 are illustrated as an example. With reference to FIGS. 1 and 4, the indication system 104 is externally disposed relative to the number of energy storage systems 102. The indication system 104 is communicably coupled with each energy storage system 102.

Figure 5:
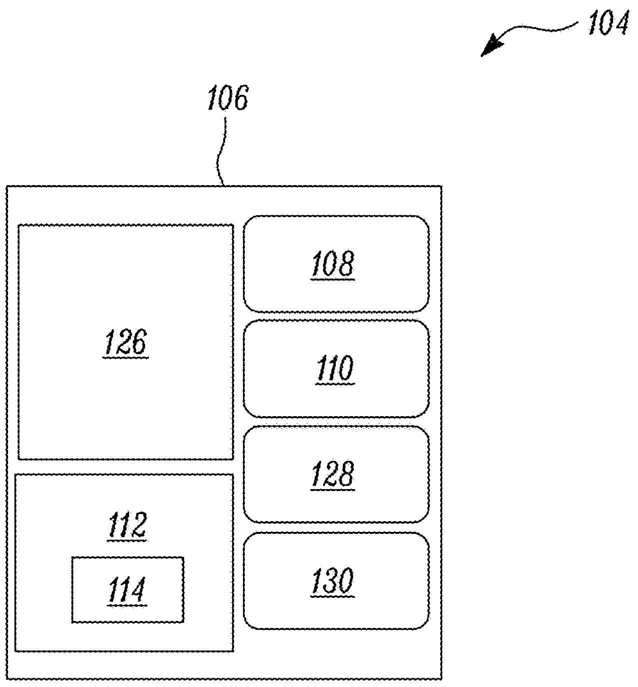
FIG. 5 is a schematic view of the indication system of FIG. 4, according to an example of the present disclosure.

Referring to FIG. 5, a schematic view of the indication system 104 for the number of energy storage systems 102 of FIG. 1 is illustrated. The indication system 104 includes a housing 106. In the illustrated embodiment of FIG. 5, the housing 106 is rectangular in shape. In other embodiments, the housing 106 may have a square shape, or any other shape, based on application attributes. In some examples, the housing 106 may be made of a metallic material, a composite material, a polymer, and/or any other suitable material.

The indication system 104 also includes a fire alarm device 108 at least partially disposed in the housing 106. The fire alarm device 108 generates a first alarm A1 (shown in FIG. 7) indicative of a fire event E1 (shown in FIG. 6) detected in one or more of the number of energy storage systems 102. The fire alarm device 108 may embody a horn or a strobe. The fire alarm device 108 may provide a visual indication and/or an audible indication of the fire event E1. It should be noted that the first alarm A1 is generated even if a single fire event E1 is detected in any one of the number of energy storage systems 102.

The indication system 104 further includes a discharge alarm device 110 at least partially disposed in the housing 106. The discharge alarm device 110 generates a second alarm A2 (shown in FIG. 7) indicative of a post fire suppressing agent release event E2 (shown in FIG. 6) of the fire suppressing agent into the detected energy storage system 102 from the number of energy storage systems 102. The post fire suppressing agent release event E2 occurs when more than one fire event E1 is detected in one or more of the number of energy storage systems 102. For example, if a first fire event E1 is detected in a first energy storage system 102, the fire suppressing agent is not released. However, if a second fire event E1 is also detected in the first energy storage system 102, the fire suppressing agent is released into the detected first energy storage system 102 after the pre-determined fire suppressing agent release time elapses. The term "pre-determined fire suppressing agent release time" as used in this disclosure indicates a time period between occurrence of the second fire event E1 in the detected energy storage system 102 and release of the fire suppressing agent into the detected energy storage system 102. In an example, a user may intervene to prevent the release of the fire suppressing agent during the pre-determined fire suppressing agent release time. It should be noted that the fire suppressing agent may be directed to any number of detected energy storage system 102 in which more than one fire event E1 was detected. The discharge alarm device 110 may embody a horn or a strobe. The discharge alarm device 110 may provide a visual indication and/or an audible indication of the post fire suppressing agent release event E2. The indication system 104 further includes a panel assembly 112 at least partially disposed in the housing 106. The panel assembly 112 includes an annunciation panel 114.

Figure 6:
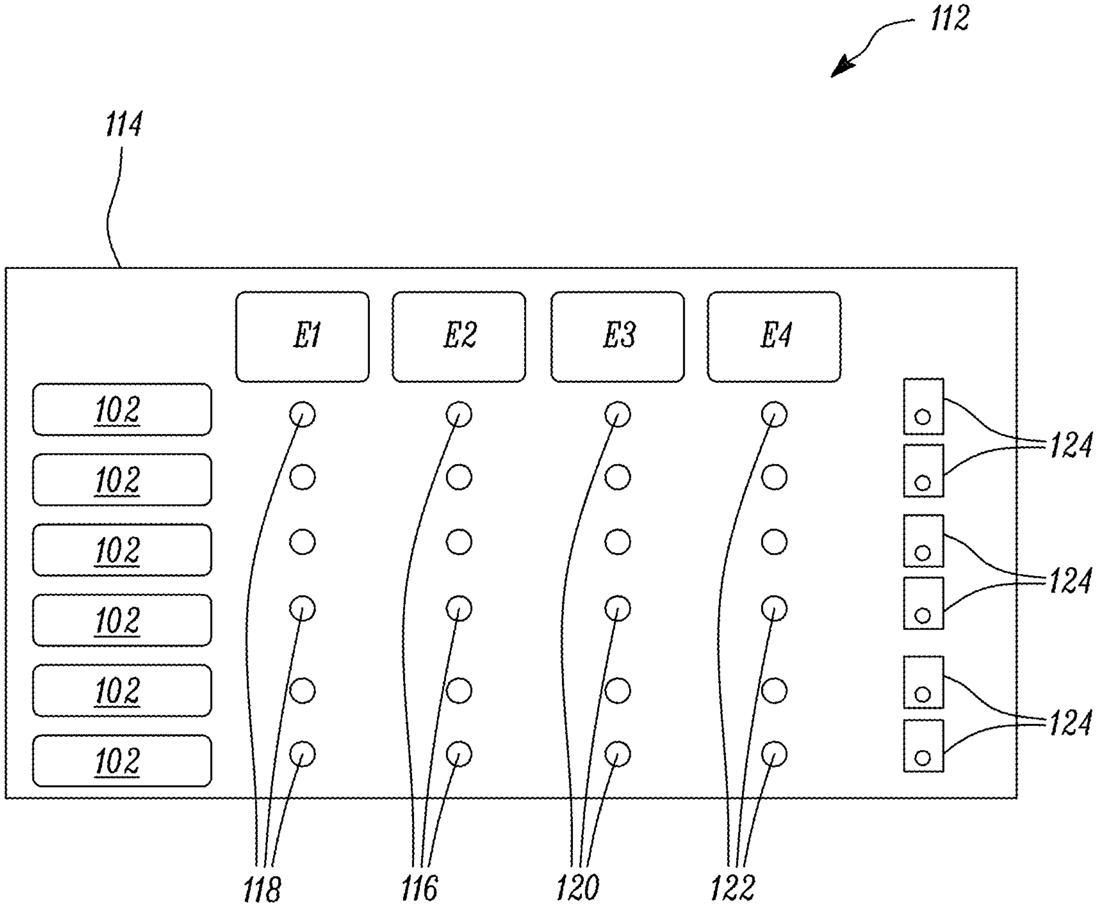
FIG. 6 is a schematic view of a panel assembly of the indication system of FIG. 4.

Referring to FIG. 6, a schematic view of the panel assembly 112 of FIG. 5 including the annunciation panel 114 is illustrated. The annunciation panel 114 generates a visual indication of the fire event E1 detected in one or more of the number of energy storage systems 102, the post fire suppressing agent release event E2 of the fire suppressing agent into the detected energy storage system 102 from the number of energy storage systems 102, a faulty operation E3 in one or more of the number of energy storage systems 102, and/or a gas detection event E4 in one or more of the number of energy storage systems 102. The annunciation panel 114 allows monitoring of a current status of each energy storage system 102. Further, the term "faulty operation E3" as used herein may include events, such as, power supply failure to the indication system 104, poor or lost connection between the indication system, lost connection between fire alarm devices, lost connection between integrating devices such as a gas detection system, a ventilation system, a heat ventilation and air conditioning (HVAC) system, an electrical system, an energy management system, a customer connection system, a fire department connection system, etc. and the energy storage systems 102, and the like, without any limitations.

The annunciation panel 114 includes a number of fire indicators 118. Each energy storage system 102 is associated with a corresponding fire indicator 118. In other words, the annunciation panel 114 includes the number of fire indicators 118 for visually indicating the fire event E1 detected in one or more of the number of energy storage systems 102.

The annunciation panel 114 includes a number of discharge indicators 116. Each energy storage system 102 is associated with a corresponding discharge indicator 116. In other words, the annunciation panel 114 includes the number of discharge indicators 116 for visually indicating the post fire suppressing agent release event E2 of the fire suppressing agent into the detected energy storage system 102 from the number of energy storage systems 102.

The annunciation panel 114 further includes a number of fault indicators 120. Each energy storage system 102 is associated with a corresponding fault indicator 120. In other words, the annunciation panel 114 includes the number of fault indicators 120 for visually indicating the faulty operation E3 in the corresponding energy storage system 102.

The annunciation panel 114 includes a number of gas detection indicators 122. Each energy storage system 102 is associated with a corresponding gas detection indicator 122. In other words, the annunciation panel 114 includes the number of gas detection indicators 122 for visually indicating the gas detection event E4 in the corresponding energy storage system 102.

The panel assembly 112 further includes a number of disable switches 124. Each energy storage system 102 is associated with a corresponding disable switch 124. Upon being operated by a user, each disable switch 124 prevents the release of the fire suppressing agent into the detected energy storage system 102 from the number of energy storage systems 102. The disable switch 124 may be switched from, for example, a normal operating mode to a maintenance mode, and vice versa.

Referring again to FIG. 5, the indication system 104 also includes the controller 126 at least partially disposed in the housing 106. The controller 126 is in communication with each of the number of energy storage systems 102 (see FIG. 1), the fire alarm device 108, the discharge alarm device 110, and the panel assembly 112. The controller 126 is embodied as a fire alarm control panel herein.

Specifically, the controller 126 is in communication with the system controller of each of the number of energy storage systems 102. In some examples, the controller 126 may be in wireless communication with the system controller of each of the number of energy storage systems 102 for example via a Bluetooth module, a Wi-Fi module, ZigBee, or the like. In other examples, the controller 126 may be in communication with the system controller of each of the number of energy storage systems 102 via communication cables.

The controller 126 may include one or more memories and one or more processors. The one or more memories may include any means of storing information, including a hard disk, an optical disk, a floppy disk, ROM (read only memory), RAM (random access memory), PROM (programmable ROM), EEPROM (electrically erasable PROM), or other computer-readable memory media.

It should be noted that the one or more processors may embody a single microprocessor or multiple microprocessors for receiving various input signals and generating output signals. Numerous commercially available microprocessors may perform the functions of the one or more processors. Each processor may further include a general processor, a central processing unit, an application specific integrated circuit (ASIC), a digital signal processor, a field programmable gate array (FPGA), a digital circuit, an analog circuit, a microcontroller, any other type of processor, or any combination thereof. Each processor may include one or more components that may be operable to execute computer executable instructions or computer code that may be stored and retrieved from the one or more memories.

The indication system 104 further includes a heater 130 at least partially disposed within the housing 106. The heater 130 maintains a temperature within the housing 106 of the indication system 104 within a predefined temperature range. A value of the predefined temperature range may be stored in the memory of the controller 126. In some examples, the heater 130 may be communicably coupled with one or more temperature sensors (not shown) disposed in the housing 106 of the indication system 104. The temperature sensors may detect a current temperature inside the housing 106 of the indication system 104. The temperature sensors may transmit a signal to the controller 126. The controller 126 may determine a variation between the current temperature within the housing 106 and the predefined temperature range and accordingly control the heater 130 to maintain the temperature within the housing 106.

The indication system 104 further includes a manual pull station 128 at least partially disposed in the housing 106. The manual pull station 128 is communicably coupled with the controller 126. Upon being operated by the user, the manual pull station 128 transmits a signal S1 (shown in FIG. 7) to the controller 126. The controller 126 activates the fire alarm device 108 to generate the first alarm A1 (see FIG. 7) upon receiving the signal S1 from the manual pull station 128.

Figure 7:
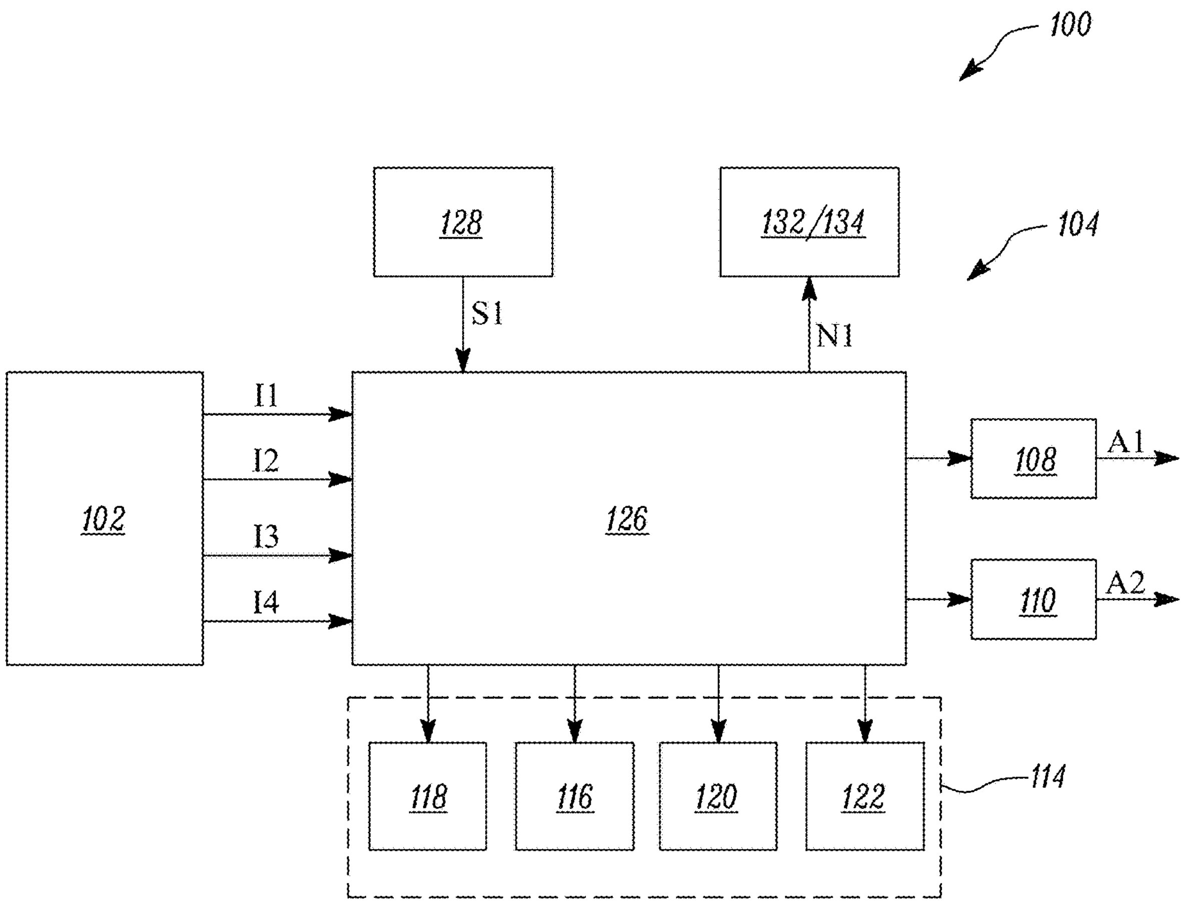
FIG. 7 is a schematic block diagram illustrating a controller of the indication system of FIG. 4.

Referring to FIG. 7, a schematic diagram of the low footprint energy storage system installation 100 is shown. The controller 126 of the indication system 104 is in communication with each of the number of energy storage systems 102, the fire alarm device 108, the discharge alarm device 110, and the panel assembly 112. The controller 126 is also in communication with the system controller of each energy storage system 102; one or more temperature sensors, a smoke sensor, a radiant energy sensor, a fire event detection signature sensor, the liquid sensors, the fault detection sensors, and/or the gas detection sensors of each energy storage system 102; and/or an explosion prevention system (not shown) associated with the energy storage systems 102.

The controller 126 receives, from one or more of the number of energy storage systems 102, the first information I1 indicative of the fire event E1 (see FIG. 6) detected in one or more of the number of energy storage systems 102. The controller 126 receives, from one or more of the number of energy storage systems 102, a second information I2 indicative of the post fire suppressing agent release event E2 (see FIG. 6) of the fire suppressing agent into the detected energy storage system 102 from the number of energy storage systems 102. The controller 126 further receives, from one or more of the number of energy storage systems 102, a third information I3 indicative of the faulty operation E3 (see FIG. 6) in one or more of the number of energy storage systems 102. The controller 126 further receives, from one or more of the number of energy storage systems 102, a fourth information I4 indicative of the gas detection event E4 (see FIG. 6) in one or more of the number of energy storage systems 102.

In an example, the controller 126 may receive the first information I1 indicative of the fire event E1 from one or more temperature sensors, smoke detection sensors, infrared flame detectors, and the like, disposed inside the energy storage system 102. Further, the controller 126 may receive the second information I2 indicative of the post fire suppressing agent release event E2 of the fire suppressing agent from one or more liquid sensors, optical level sensors, ultrasonic sensors, and the like, disposed inside the energy storage system 102. Furthermore, the controller 126 may receive the third information I3 indicative of the faulty operation E3 from one or more fault detection sensors disposed inside the number of energy storage systems 102. Moreover, the controller 126 may receive the fourth information I4 indicative of the gas detection event E4 from one or more gas detection sensors, winsen sensors, and the like, disposed inside the number of energy storage systems 102.

The controller 126 activates the fire alarm device 108 to generate the first alarm A1 upon receiving the first information I1. The fire alarm device 108 may in turn indicate that the fire event E1 has occurred in one or more of the energy storage systems 102. The controller 126 also activates the discharge alarm device 110 to generate the second alarm A2 upon receiving the second information I2. The second alarm A2 may in turn indicate that the post fire suppressing agent release event E2 of the fire suppressing agent has occurred in the detected energy storage system 102. Specifically, the second alarm A2 indicates that more than one fire event E1 was detected in one or more of the energy storage systems 102, post which the fire suppressing agent was released in the detected energy storage system 102 after the pre-determined fire suppressing agent release time elapses.

The controller 126 further generates, via the annunciation panel 114, the visual indication upon receiving the first information I1, the second information I2, the third information I3, and/or the fourth information I4. Specifically, the controller 126 generates, via one or more of the number of fire indicators 118, the visual indication of the fire event E1 detected in one or more of the number of energy storage systems 102 upon receiving the first information I1. The controller 126 also generates via one or more of the number of discharge indicators 116, the visual indication of the post fire suppressing agent release event E2 of the fire suppressing agent into the detected energy storage system 102 from the number of energy storage systems 102 upon receiving the second information I2. The controller 126 further generates, via one or more of the number of fault indicators 120, the visual indication of the faulty operation E3 in the corresponding energy storage system 102 upon receiving the third information I3. The controller 126 further generates, via one or more of the number of gas detection indicators 122, the visual indication of the gas detection event E4 in the corresponding energy storage system 102 upon receiving the fourth information I4.

In some examples, based on receipt of the first, second, third, or the fourth information I1, I2, I3, I4, the controller 126 may also transmit a control signal to the system controller to initiate a safety mitigation process. In some examples, based on receipt of the first, second, third, or the fourth information I1, I2, I3, I4, the controller 126 may also transmit a control signal to activate the explosion prevention system associated with the energy storage systems 102.

The controller 126 is also communicably coupled with a fire department 132 and/or a back office 134. The controller 126 transmits a notification N1 to the fire department 132 and/or the back office 134 upon receiving the first information I1, the second information I2, the third information I3, and/or the fourth information I4 from one or more of the number of energy storage systems 102.

In an example, based on the receipt of the first information I1 by the controller 126, the first alarm A1 may be generated, the second alarm A2 may be generated, and the notification N1 may be sent to the fire department 132 and/or the back office 134. Furthermore, the annunciation panel 114 may indicate the energy storage system 102 in which the fire event E1 was detected via the corresponding fire indicator 118 of the annunciation panel 114. Moreover, the controller 126 may also transmit the control signal to the system controller to initiate the safety mitigation process.

In an example, based on the receipt of the second information I2 by the controller 126, the first alarm A1 may be generated, the second alarm A2 may be generated, and the notification N1 may be sent to the fire department 132 and/or the back office 134. Furthermore, the annunciation panel 114 may indicate the energy storage system 102 in which the post fire suppressing agent release event E2 of the fire suppressing agent was detected via the corresponding discharge indicator 116 of the annunciation panel 114. Moreover, the controller 126 may also transmit the control signal to the system controller to initiate the safety mitigation process.

In an example, based on the receipt of the third information I3 by the controller 126, the first alarm A1 may be generated and the notification N1 may be sent to the back office 134. Further, the annunciation panel 114 may indicate the energy storage system 102 from which the third information I3 indicative of the faulty operation E3 was received via the corresponding fault indicator 120 of the annunciation panel 114. Moreover, the controller 126 may also transmit the control signal to the system controller to initiate the safety mitigation process.

In an example, based on the receipt of the fourth information I4 by the controller 126, the first alarm A1 may be generated, the second alarm A2 may be generated, and the notification N1 may be sent to the fire department 132 and/or the back office 134. Further, the annunciation panel 114 may indicate the energy storage system 102 in which the gas detection event E4 was detected via the corresponding gas detection indicator 122 of the annunciation panel 114. Moreover, the controller 126 may also transmit the control signal to the system controller to initiate the safety mitigation process and the control signal to activate the explosion prevention system associated with the energy storage systems 102.

In some examples, each energy storage system 102 may include individual manual stop buttons disposed on the corresponding energy storage system 102. In an example, based on a pressing of the manual stop button with any one of the energy storage system 102, the first alarm A1 may be generated, and the notification N1 may be sent to the fire department 132 and/or the back office 134. Further, the annunciation panel 114 may indicate the energy storage system 102 for which the manual stop button was pressed. Moreover, the controller 126 may also transmit the control signal to the system controller to initiate the safety mitigation process.

In an example, based on the operation of one of the disable switches 124 associated with the annunciation panel 114. The disable switch 124 leads to activation and disconnection of the fire suppressing agent release circuit.

Figure 8:
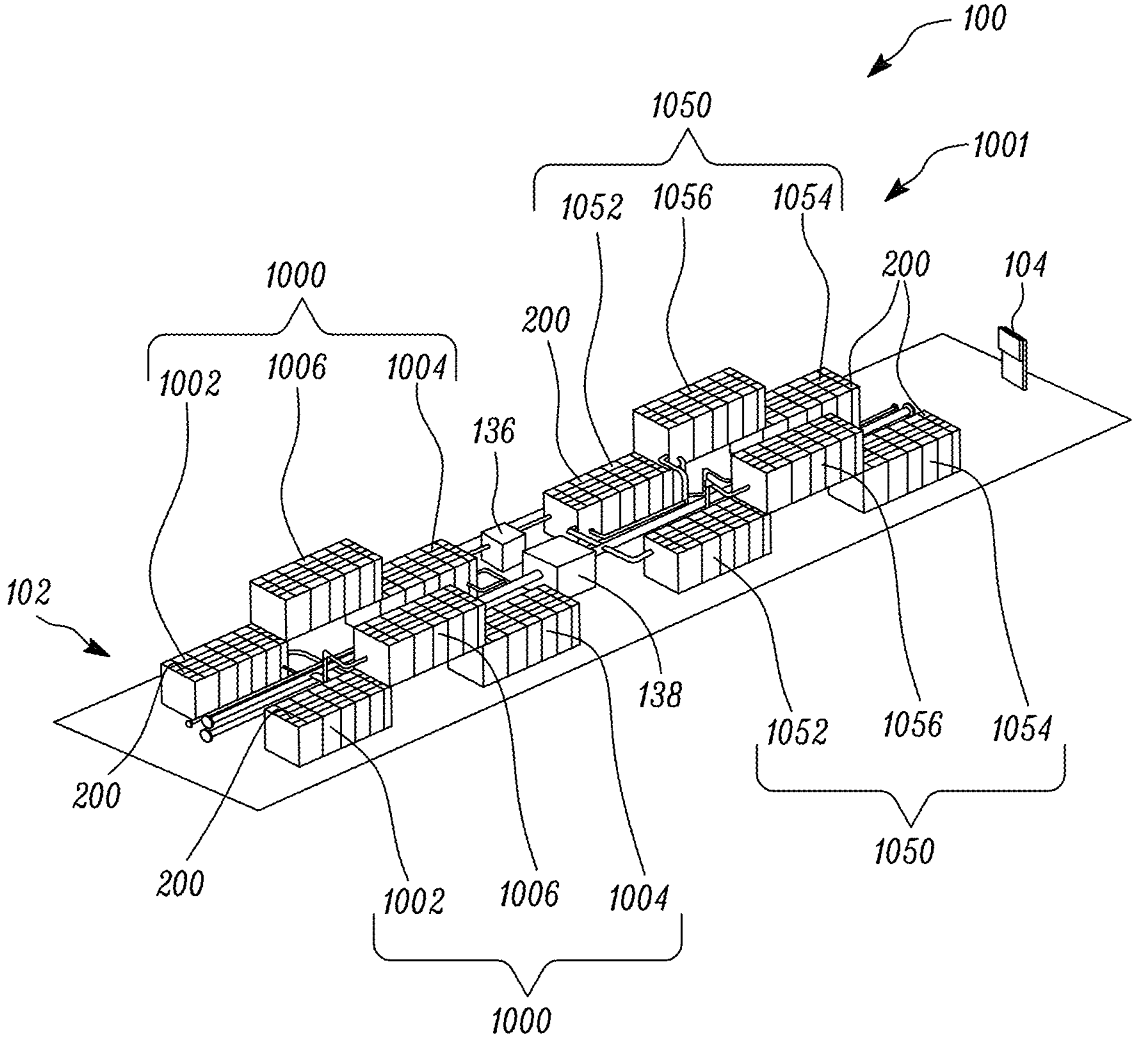
FIG. 8 is a schematic perspective view of the low footprint energy storage system installation illustrating an exemplary arrangement of the number of energy storage systems, according to another example of the present disclosure.

Referring to FIG. 8, a schematic perspective view of the low footprint energy storage system installation 100 illustrating an arrangement 1001 of the number of energy storage systems 102 is shown, according to another example of the present disclosure. The number of energy storage systems 102 include one or more first sets 1000 of energy storage systems 102. Specifically, in the illustrated example of FIG. 8 the number of energy storage systems 102 includes two first sets 1000 of energy storage systems 102 are illustrated. Alternatively, any number of first sets 1000 of energy storage systems 102 may be arranged, as per application attributes.

The one or more first sets 1000 of energy storage systems 102 includes a first energy storage system 1002, a second energy storage system 1004 longitudinally spaced apart from the first energy storage system 1002, and a third energy storage system 1006 at least partially disposed atop each of the first energy storage system 1002 and the second energy storage system 1004.

The number of energy storage systems 102 also includes one or more second sets 1050 of energy storage systems 102 longitudinally spaced apart from the one or more first sets 1000 of energy storage systems 102. Specifically, in the illustrated example of FIG. 8, the number of energy storage systems 102 includes two second sets 1050 of energy storage systems 102 are illustrated. Alternatively, any number of second sets 1050 of energy storage systems 102 may be arranged, as per application attributes.

The one or more second sets 1050 of energy storage systems 102 includes a first energy storage system 1052, a second energy storage system 1054 longitudinally spaced apart from the first energy storage system 1052, and a third energy storage system 1056 at least partially disposed atop each of the first energy storage system 1052 and the second energy storage system 1054.

At least a portion of the thermal management system 136 and at least a portion of the fire suppressing system 138 are disposed between the one or more first sets 1000 of energy storage systems 102 and the one or more second sets 1050 of energy storage systems 102.

With reference to FIGS. 1 and 8, one or more of the number of energy storage systems 102 includes a deflagration panel 200. Specifically, the deflagration panel 200 is coupled to a top surface of each of the number of energy storage systems 102. The deflagration panel 200 enables a force that is generated due to increase in an internal pressure of the energy storage system 102 to be directed in an upward direction thereby providing ventilation to the corresponding energy storage system 102.

Figure 9:
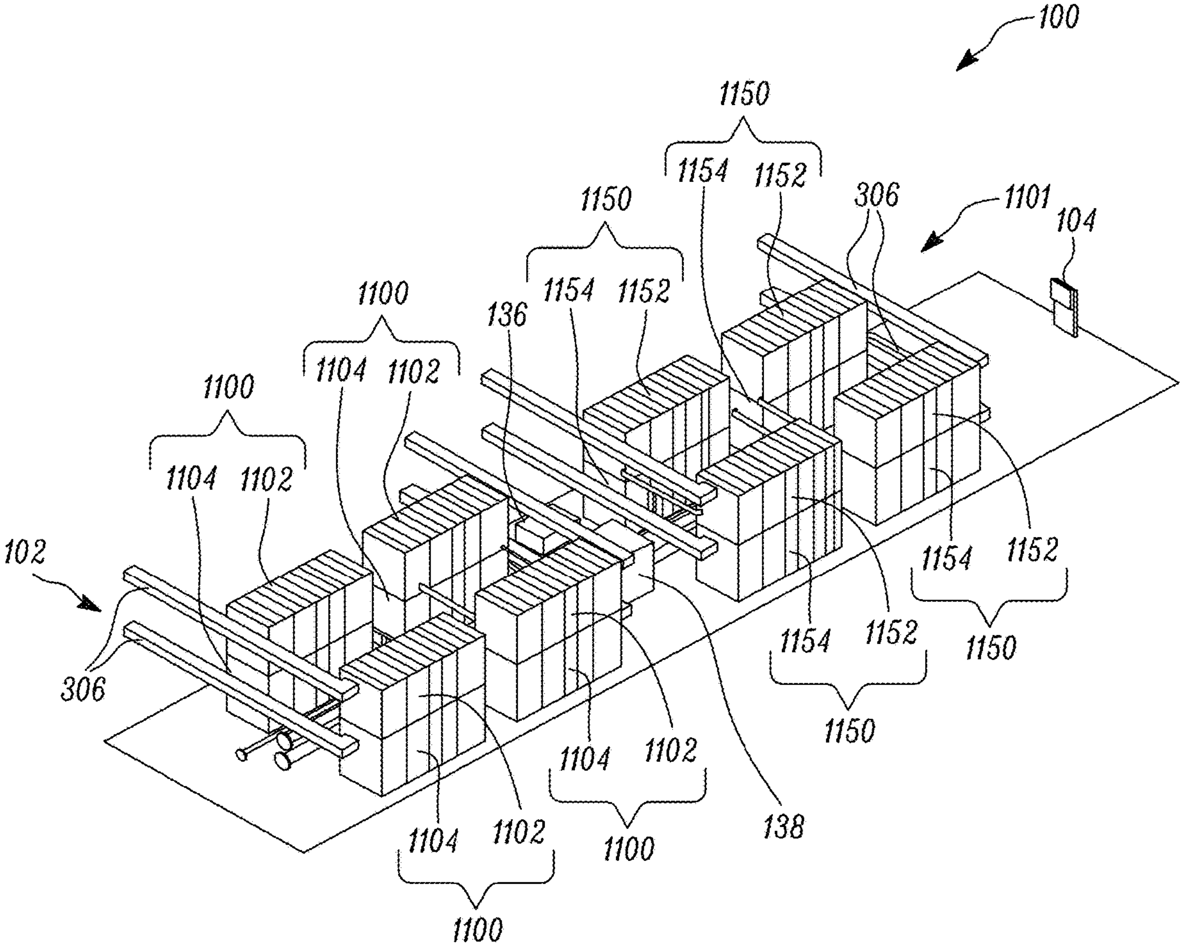
FIG. 9 is a schematic perspective view of the low footprint energy storage system installation illustrating an exemplary arrangement of the number of energy storage systems, according to yet another example of the present disclosure.

Referring to FIG. 9, a schematic perspective view of the low footprint energy storage system installation 100 illustrating an arrangement 1101 of the number of energy storage systems 102 is shown, according to yet another example of the present disclosure. The number of energy storage systems 102 includes one or more first sets 1100 of energy storage systems 102. The one or more first sets 1100 of energy storage systems 102 includes a first energy storage system 1102 and a second energy storage system 1104 disposed atop the first energy storage system 1102. Specifically, in the illustrated example of FIG. 9, the number of energy storage systems 102 includes four first sets 1100 of energy storage systems 102 are illustrated. Alternatively, any number of first sets 1100 of energy storage systems 102 may be arranged, as per application attributes.

The number of energy storage systems 102 also includes one or more second sets 1150 of energy storage systems 102 longitudinally spaced apart from the one or more first sets 1100 of energy storage systems 102. Specifically, in the illustrated example of FIG. 9, the number of energy storage systems 102 includes four second sets 1150 of energy storage systems 102 are illustrated. Alternatively, any number of second sets 1150 of energy storage systems 102 may be arranged, as per application attributes. The one or more second sets 1150 of energy storage systems 102 includes a first energy storage system 1152 and a second energy storage system 1154 disposed atop the first energy storage system 1152.

At least a portion of the thermal management system 136 and/or the fire suppressing system 138 is disposed between the one or more first sets 1100 of energy storage systems 102 and the one or more second sets 1150 of energy storage systems 102.

Figure 10:
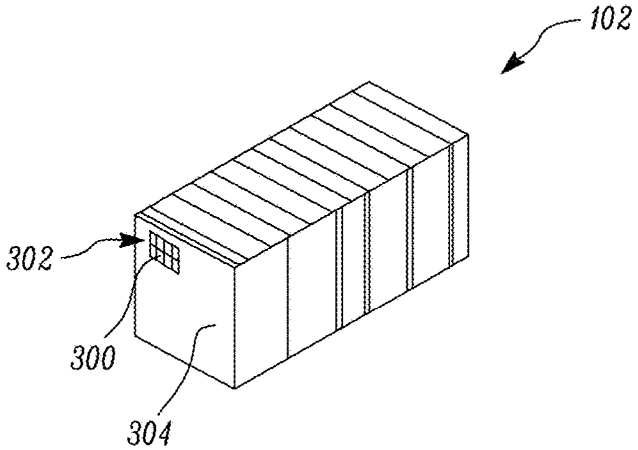
FIG. 10 illustrates a single energy storage system of FIG. 9 having a deflagration panel.
Figure 11:
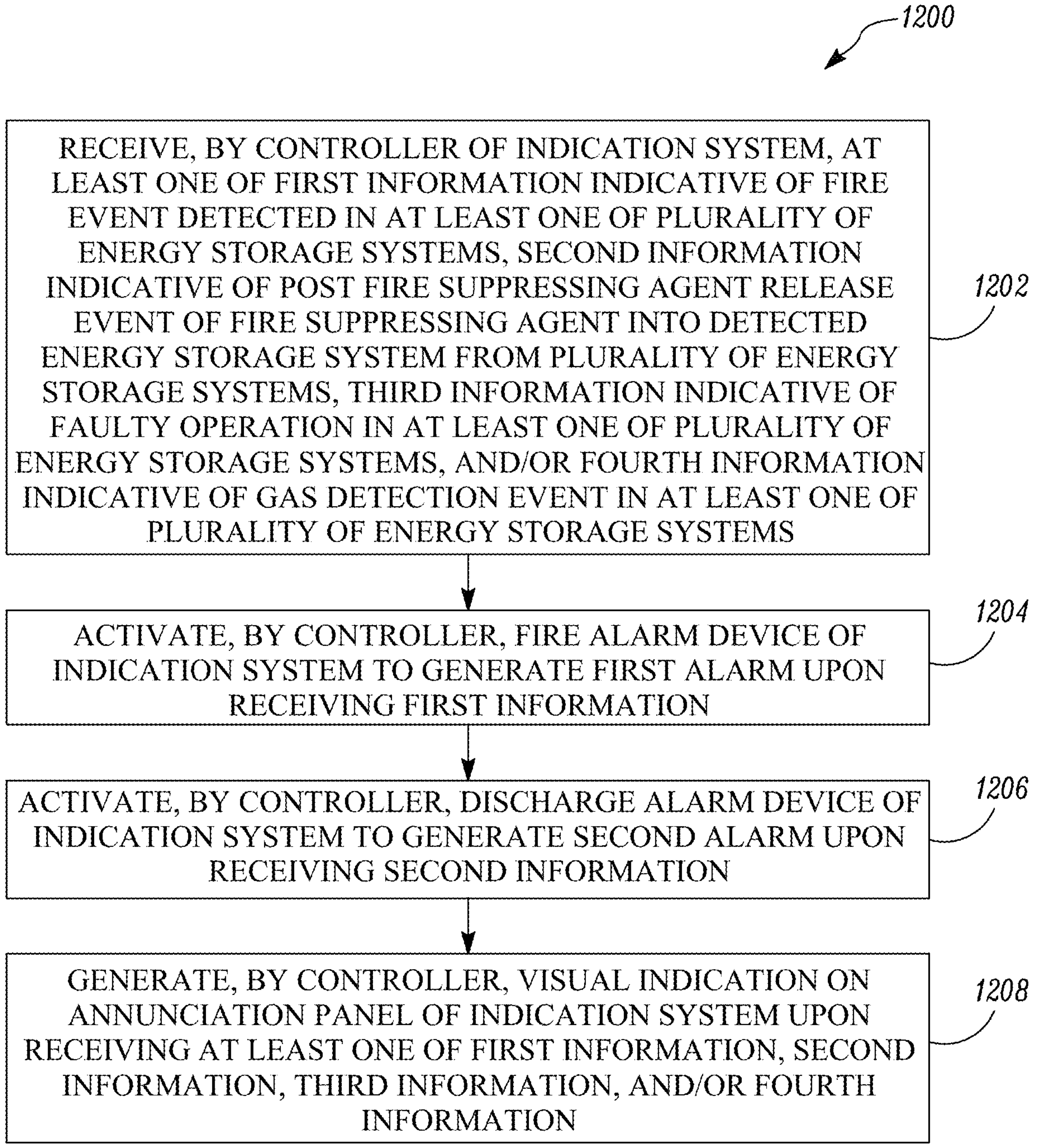
FIG. 11 is a flowchart of an indication method for the number of energy storage systems, according to an example of the present disclosure.

With reference to FIGS. 9 and 10, one or more of the number of energy storage systems 102 includes a deflagration panel 300. Furthermore, each of the number of the energy storage systems 102 may include a vent 302. The vent 302 is disposed at a side surface 304 of each of the number the energy storage systems 102. The deflagration panel 300 is disposed in the vent 302. The deflagration panel 300 is substantially and functionally similar to the deflagration panel 200 shown in FIGS. 1 and 8. The vent 302 of the energy storage system 102 may be coupled with a duct 306 to direct the combustion gases and/or internal pressure away from the energy storage systems 102 and towards the surrounding.

It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

The present disclosure relates to the low footprint energy storage system installation 100 that includes the number of energy storage systems 102 that may be arranged according to any of the arrangement 900, the arrangement 1001, and the arrangement 1101. The arrangements 900, 1001, 1101 may allow installation of multiple energy storage systems 102, the thermal management system 136, and the fire suppressing system 138 in a confined space thus reducing the site area requirement to install same number of energy storage systems 102 as compared to conventional energy storage system installations. Specifically, the arrangement 900, the arrangement 1001, and the arrangement 1101 may allow effective utilization of available space and may also allow addition of energy storage systems 102 thereby increasing energy density per area. Further, the arrangements 900, 1001, 1101 may improve scalability of the energy storage systems 102, while providing a higher energy density and a lower footprint energy storage system.

The arrangements 1001, 1101 include the common thermal management system 136 to maintain the temperature of each of the number of energy storage systems 102 within the predetermined temperature range. Further, the arrangements 1001, 1101 include the common fire suppressing system 138 that supplies the fire suppressing agent towards one or more of the number of energy storage systems 102 upon receipt of the first information I1. Furthermore, the arrangements 900, 1001, 1101 may allow scalability, for example, additional energy storage systems 102 may be added, as per application requirements. Moreover, the first and second fluid tubes 142, 148 connecting the thermal management system 136 and the fire suppressing system 138 with each energy storage system 102 may also be scalable in case of addition of energy storage systems.

The arrangements 900, 1001, 1101 may isolate each energy storage system 102 in such a way that in case the fire event E1 is detected in one or more of the energy storage system 102, the arrangements 900, 1001, 1101 may prevent spread of fire in other energy storage systems 102. Further, the energy storage systems 102 arranged in the arrangements 900, 1001, 1101 may reduce part numbers as compared to conventional energy storage systems that include separate thermal management systems and fire suppressing systems for each energy storage system 102. Hence, the arrangements 900, 1001, 1101 of the energy storage systems 102 may be reliable in operation, easy to audit, may reduce part numbers associated with the low footprint energy storage system installation 100, may simplify a design of the low footprint energy storage system installation 100, and may be easy to maintain. Further, the arrangements 900, 1001, 1101 of the energy storage systems 102 may enable better monitoring, control, and management of the energy storage systems 102. Moreover, the arrangements 900, 1001, 1101 may allow easier servicing and/or replacement of individual energy storage systems 102.

Furthermore, each of the number of energy storage systems 102 includes the deflagration panel 200, 300. The deflagration panel 200, 300 may vent-off the internal pressure generated inside the energy storage systems 102, for example, during fire events E1. Each of the number of the energy storage systems 102 may include the vent 302 that may be coupled with the duct 306 to direct the combustion gases and/or internal pressure generated inside the energy storage systems 102 away from the energy storage systems 102. Thus, the duct 306 may eliminate a no-go zone and may allow the operator to monitor the energy storage systems 102.

Furthermore, the low footprint energy storage system installation 100 includes the indication system 104 for the energy storage systems 102. The indication system 104 provides a single unified fire alarm system for the number of energy storage systems 102. The indication system 104 includes the common fire alarm device 108, the common discharge alarm device 110, the common manual pull station 128, and the common panel assembly 112 for accessing the disable switches 124 for the number of energy storage systems 102. The indication system 104 may provide a simplified setup and may reduce a complexity of the energy storage system 102 by providing the common indication system 104. The indication system 104 may allow faster installation of the energy storage systems 102 as the indication system 104 eliminates the requirement of individual fire alarm components on each energy storage system 102.

The indication system 104 may simplify a design and an assembly of the energy storage systems 102 as the indication system 104 eliminates a requirement for additional mounting devices to mount the fire alarm device 108, the discharge alarm device 110, the panel assembly 112, the manual pull station 128, the controller 126, and the disable switch 124 on each energy storage system 102. Further, the indication system 104 eliminates sealing requirement and use of cables that may be otherwise required to connect the energy storage system 102 with each of the fire alarm device 108, the discharge alarm device 110, the panel assembly 112, the manual pull station 128, and the disable switch 124. Since, the fire alarm device 108, the discharge alarm device 110, the panel assembly 112, the manual pull station 128, the controller 126, and the disable switches 124 are integrated into the single housing 106, the indication system 104 may not require a separate housing/module for each energy storage system 102.

Furthermore, the panel assembly 112 of the indication system 104 may allow easy and quicker identification of the energy storage system 102 that is experiencing the fire event E1, the post fire suppressing agent release event E2, the faulty operation E3, and/or the gas detection event E4. Further, as the manual pull station 128 is present in the indication system 104, the indication system 104 may eliminate the need for users/operators to visit each energy storage system 102 to manually activate the manual pull station 128. Furthermore, the indication system 104 may automatically release the fire suppressing agent when more than one fire event E1 is detected in one or more energy storage system 102.

The indication system 104 may also allow the user to access the disable switches 124 to break the electrical circuit of the energy storage system 102 during maintenance or service of the corresponding energy storage system 102. Thus, the indication system 104 may eliminate the need for operators to visit each energy storage system 102 to manually activate the disable switches. The indication system 104 may ensure an efficient operation of the energy storage systems 102 and may be retrofitted in existing arrangements of energy storage systems. The indication system 104 may also reduce cost and complexity associated with installation and working of the energy storage systems 102.

FIG. 12 is a flowchart of an indication method 1200 for the number of energy storage systems 102. At step 1202, the controller 126 of the indication system 104 receives the first information I1 indicative of the fire event E1 detected in one or more of the number of energy storage systems 102, the second information I2 indicative of the post fire suppressing agent release event E2 of the fire suppressing agent into the detected energy storage system 102 from the number of energy storage systems 102, the third information I3 indicative of the faulty operation E3 in one or more of the number of energy storage systems 102, and/or the fourth information I4 indicative of the gas detection event E4 in one or more of the number of energy storage systems 102. The post fire suppressing agent release event E2 occurs when more than one fire event E1 is detected in one or more of the number of energy storage systems 102.

At step 1204, the controller 126 activates the fire alarm device 108 of the indication system 104 to generate the first alarm A1 upon receiving the first information I1. The first alarm A1 is indicative of the fire event E1 detected in one or more of the number of energy storage systems 102.

At step 1206, the controller 126 activates the discharge alarm device 110 of the indication system 104 to generate the second alarm A2 upon receiving the second information I2. The second alarm A2 is indicative of the post fire suppressing agent release event E2 of the fire suppressing agent into the detected energy storage system 102 from the number of energy storage systems 102.

At step 1208, the controller 126 generates the visual indication on the annunciation panel 114 of the indication system 104 upon receiving the first information I1, the second information I2, the third information I3, and/or the fourth information I4. The visual indication is indicative of the fire event E1 detected in one or more of the number of energy storage systems 102, the post fire suppressing agent release event E2 of the fire suppressing agent into the detected energy storage system 102 from the number of energy storage systems 102, the faulty operation E3 in one or more of the number of energy storage systems 102, and/or the gas detection event E4 in one or more of the number of energy storage systems 102.

The indication method 1200 further includes a step at which the heater 130 of the indication system 104 maintains the temperature within the housing 106 of the indication system 104 within the predefined temperature range. The fire alarm device 108, the discharge alarm device 110, the annunciation panel 114, and the controller 126 are at least partially disposed within the housing 106.

The indication system 104 further includes the manual pull station 128 that is communicably coupled with the controller 126. The indication method 1200 includes a step at which the user operates the manual pull station 128. The indication method 1200 also includes a step at which the manual pull station 128 transmits the signal S1 to the controller 126. The indication method 1200 further includes a step at which the controller 126 activates the fire alarm device 108 to generate the first alarm A1 upon receiving the signal S1 from the manual pull station 128.

The indication system 104 further includes the number of disable switches 124. Each energy storage system 102 is associated with the corresponding disable switch 124. The indication method 1200 further includes a step at which the release of the fire suppressing agent is prevented into the detected energy storage system 102 upon operation of the corresponding disable switch 124 from the number of disable switches 124 by the user.

The controller 126 is communicably coupled with the fire department 132 and/or the back office 134. The indication method 1200 further includes a step at which the notification N1 is transmitted to the fire department 132 and/or the back office 134 upon receiving the first information I1, the second information I2, the third information I3, and/or the fourth information I4 from one or more of the number of energy storage systems 102.

While aspects of the present disclosure have been particularly shown and described with reference to the embodiments above, it will be understood by those skilled in the art that various additional embodiments may be contemplated by the modification of the disclosed work machine, systems and methods without departing from the spirit and scope of the disclosure. Such embodiments should be understood to fall within the scope of the present disclosure as determined based upon the claims and any equivalents thereof.

What is claimed is:

1. A low footprint energy storage system installation comprising:

a plurality of energy storage systems;

an indication system externally disposed relative to the plurality of energy storage systems, the indication system including:

a housing;

a fire alarm device at least partially disposed in the housing and configured to generate a first alarm indicative of a fire event detected in at least one of the plurality of energy storage systems;

a discharge alarm device at least partially disposed in the housing and configured to generate a second alarm indicative of a post fire suppressing agent release event of a fire suppressing agent into a detected energy storage system from the plurality of energy storage systems, wherein the post fire suppressing agent release event occurs when more than one fire event is detected in at least one of the plurality of energy storage systems;

a panel assembly at least partially disposed in the housing and including an annunciation panel, wherein the annunciation panel is configured to generate a visual indication of at least one of the fire event detected in at least one of the plurality of energy storage systems, the post fire suppressing agent release event of the fire suppressing agent into the detected energy storage system from the plurality of energy storage systems, a faulty operation in at least one of the plurality of energy storage systems, and/or a gas detection event in at least one of the plurality of energy storage systems; and a controller at least partially disposed in the housing and in communication with each of the plurality of energy storage systems, the fire alarm device, the discharge alarm device, and the panel assembly, wherein the controller is configured to:

receive, from at least one of the plurality of energy storage systems, at least one of a first information indicative of the fire event detected in at least one of the plurality of energy storage systems, a second information indicative of the post fire suppressing agent release event of the fire suppressing agent into the detected energy storage system from the plurality of energy storage systems, a third information indicative of the faulty operation in at least one of the plurality of energy storage systems, and/or a fourth information indicative of the gas detection event in at least one of the plurality of energy storage systems;

activate the fire alarm device to generate the first alarm upon receiving the first information;

activate the discharge alarm device to generate the second alarm upon receiving the second information; and generate, via the annunciation panel, the visual indication upon receiving at least one of the first information, the second information, the third information, and/or the fourth information;

a thermal management system in fluid communication with each of the plurality of energy storage systems and configured to maintain a temperature of each of the plurality of energy storage systems within a predetermined temperature range; and a fire suppressing system communicably coupled with the controller of the indication system and in fluid communication with each of the plurality of energy storage systems, wherein upon receiving the second information from the detected energy storage system from the plurality of energy storage systems, the controller is configured to transmit a control signal with a predetermined fire suppressing agent release time to the fire suppressing system, and wherein upon receiving the control signal, the fire suppressing system is configured to supply the fire suppressing agent towards the detected energy storage system from the plurality of energy storage systems.

2. The low footprint energy storage system installation of claim 1, wherein the indication system further includes a manual pull station at least partially disposed in the housing and communicably coupled with the controller, wherein, upon being operated by a user, the manual pull station is configured to transmit a signal to the controller, and wherein the controller is configured to activate the fire alarm device to generate the first alarm upon receiving the signal from the manual pull station.

3. The low footprint energy storage system installation of claim 1, wherein the plurality of energy storage systems include:

at least one first set of energy storage system, wherein the at least one first set of energy storage system includes a first energy storage system, a second energy storage system longitudinally spaced apart from the first energy storage system, and a third energy storage system at least partially disposed atop each of the first energy storage system and the second energy storage system; and at least one second set of energy storage system longitudinally spaced apart from the at least one first set of energy storage system, wherein the at least one second set of energy storage system includes a first energy storage system, a second energy storage system longitudinally spaced apart from the first energy storage system, and a third energy storage system at least partially disposed atop each of the first energy storage system and the second energy storage system, and wherein at least a portion of the thermal management system and at least a portion of the fire suppressing system are disposed between the at least one first set of energy storage system and the at least one second set of energy storage system.

4. The low footprint energy storage system installation of claim 1, wherein the plurality of energy storage systems include:

at least one first set of energy storage system, wherein the at least one first set of energy storage system includes a first energy storage system, a second energy storage system longitudinally spaced apart from the first energy storage system, and a third energy storage system at least partially disposed atop each of the first energy storage system and the second energy storage system, and wherein at least a portion of the thermal management system and/or the fire suppressing system is disposed between the first energy storage system and the second energy storage system of the at least one first set of energy storage systems; and at least one second set of energy storage system laterally spaced apart from the at least one first set of energy storage system, wherein the at least one second set of energy storage system includes a first energy storage system, a second energy storage system longitudinally spaced apart from the first energy storage system, and a third energy storage system at least partially disposed atop each of the first energy storage system and the second energy storage system, and wherein at least a portion of the other of the thermal management system and/or the fire suppressing system is disposed between the first energy storage system and the second energy storage system of the at least one second set of energy storage system.

5. The low footprint energy storage system installation of claim 1, wherein the plurality of energy storage systems include:

at least one first set of energy storage system including a first energy storage system and a second energy storage system disposed atop the first energy storage system; and at least one second set of energy storage system longitudinally spaced apart from the at least one first set of energy storage system, the at least one second set of energy storage system including a first energy storage system and a second energy storage system disposed atop the first energy storage system, wherein at least a portion of each of the thermal management system and/or the fire suppressing system is disposed between the at least one first set of energy storage system and the at least one second set of energy storage system.

6. The low footprint energy storage system installation of claim 1, wherein at least one of the plurality of energy storage systems includes a deflagration panel.

7. The low footprint energy storage system installation of claim 1, wherein the thermal management system includes a coolant tank, a plurality of first fluid tubes, and a plurality of first valves in fluid communication with the coolant tank, and wherein each of the plurality of energy storage systems is in fluid communication with the coolant tank via a corresponding first fluid tube and a corresponding first valve.

8. The low footprint energy storage system installation of claim 1, wherein the fire suppressing system includes a fire suppressing agent tank, a plurality of second fluid tubes, and a plurality of second valves in fluid communication with the fire suppressing agent tank, wherein each of the plurality of energy storage systems is in fluid communication with the fire suppressing agent tank via a corresponding second fluid tube and a corresponding second valve, and wherein upon receiving the first information from at least one of the plurality of energy storage systems, the controller is configured to place the corresponding second valve in an open state to supply the fire suppressing agent towards the corresponding energy storage system.

9. An indication system for a plurality of energy storage systems, the indication system comprising:

a housing;

a fire alarm device at least partially disposed in the housing and configured to generate a first alarm indicative of a fire event detected in at least one of the plurality of energy storage systems;

a discharge alarm device at least partially disposed in the housing and configured to generate a second alarm indicative of a post fire suppressing agent release event of a fire suppressing agent into a detected energy storage system from the plurality of energy storage systems, wherein the post fire suppressing agent release event occurs when more than one fire event is detected in at least one of the plurality of energy storage systems;

a panel assembly at least partially disposed in the housing and including an annunciation panel, wherein the annunciation panel is configured to generate a visual indication of at least one of the fire event detected in at least one of the plurality of energy storage systems, the post fire suppressing agent release event of the fire suppressing agent into the detected energy storage system from the plurality of energy storage systems, a faulty operation in at least one of the plurality of energy storage systems, and/or a gas detection event in at least one of the plurality of energy storage systems; and a controller at least partially disposed in the housing and in communication with each of the plurality of energy storage systems, the fire alarm device, the discharge alarm device, and the panel assembly, wherein the controller is configured to:

receive, from at least one of the plurality of energy storage systems, at least one of a first information indicative of the fire event detected in at least one of the plurality of energy storage systems, a second information indicative of the post fire suppressing agent release event of the fire suppressing agent into the detected energy storage system from the plurality of energy storage systems, a third information indicative of the faulty operation in at least one of the plurality of energy storage systems, and/or a fourth information indicative of the gas detection event in at least one of the plurality of energy storage systems;

activate the fire alarm device to generate the first alarm upon receiving the first information;

activate the discharge alarm device to generate the second alarm upon receiving the second information; and generate, via the annunciation panel, the visual indication upon receiving at least one of the first information, the second information, the third information, and/or the fourth information.

10. The indication system of claim 9, wherein the indication system is externally disposed relative to the plurality of energy storage systems.

11. The indication system of claim 9 further comprising a manual pull station at least partially disposed in the housing and communicably coupled with the controller, wherein, upon being operated by a user, the manual pull station is configured to transmit a signal to the controller, and wherein the controller is configured to activate the fire alarm device to generate the first alarm upon receiving the signal from the manual pull station.

12. The indication system of claim 9, wherein the annunciation panel includes:

a plurality of fire indicators, wherein each energy storage system is associated with a corresponding fire indicator, and wherein the controller is further configured to generate, via at least one of the plurality of fire indicators, the visual indication of the fire event detected in at least one of the plurality of energy storage systems upon receiving the first information;

a plurality of discharge indicators, wherein each energy storage system is associated with a corresponding discharge indicator, and wherein the controller is further configured to generate, via at least one of the plurality of discharge indicators, the visual indication of the post fire suppressing agent release event of the fire suppressing agent into the detected energy storage system from the plurality of energy storage systems upon receiving the second information;

a plurality of fault indicators, wherein each energy storage system is associated with a corresponding fault indicator, and wherein the controller is further configured to generate, via at least one of the plurality of fault indicators, the visual indication of the faulty operation in a corresponding energy storage system upon receiving the third information; and a plurality of gas detection indicators, wherein each energy storage system is associated with a corresponding gas detection indicator, and wherein the controller is further configured to generate, via at least one of the plurality of gas detection indicators, the visual indication of the gas detection event in a corresponding energy storage system upon receiving the fourth information.

13. The indication system of claim 9, wherein the panel assembly further includes a plurality of disable switches, wherein each energy storage system is associated with a corresponding disable switch, and wherein, upon being operated by a user, each disable switch prevents a release of the fire suppressing agent into the detected energy storage system from the plurality of energy storage system.

14. The indication system of claim 9, wherein the controller is communicably coupled with a fire department and/or a back office, and wherein the controller is configured to transmit a notification to the fire department and/or the back office upon receiving at least one of the first information, the second information, the third information, and/or the fourth information from at least one of the plurality of energy storage systems.

15. The indication system of claim 9 further comprising a heater at least partially disposed within the housing, wherein the heater is configured to maintain a temperature within the housing of the indication system within a predefined temperature range.

16. An indication method for a plurality of energy storage systems, the indication method comprising:

receiving, by a controller of an indication system, at least one of a first information indicative of a fire event detected in at least one of the plurality of energy storage systems, a second information indicative of a post fire suppressing agent release event of a fire suppressing agent into a detected energy storage system from the plurality of energy storage systems, a third information indicative of a faulty operation in at least one of the plurality of energy storage systems, and/or a fourth information indicative of a gas detection event in at least one of the plurality of energy storage systems, wherein the post fire suppressing agent release event occurs when more than one fire event is detected in at least one of the plurality of energy storage systems;

activating, by the controller, a fire alarm device of the indication system to generate a first alarm upon receiving the first information, wherein the first alarm is indicative of the fire event detected in at least one of the plurality of energy storage systems;

activating, by the controller, a discharge alarm device of the indication system to generate a second alarm upon receiving the second information, wherein the second alarm is indicative of the post fire suppressing agent release event of the fire suppressing agent into the detected energy storage system from the plurality of energy storage systems; and generating, by the controller, a visual indication on an annunciation panel of the indication system upon receiving at least one of the first information, the second information, the third information, and/or the fourth information, wherein the visual indication is indicative of at least one of the fire event detected in at least one of the plurality of energy storage systems, the post fire suppressing agent release event of the fire suppressing agent into the detected energy storage system from the plurality of energy storage systems, the faulty operation in at least one of the plurality of energy storage systems, and/or the gas detection event in at least one of the plurality of energy storage systems.

17. The indication method of claim 16, wherein the indication system further includes a manual pull station that is communicably coupled with the controller, the method further comprising:

operating, by a user, the manual pull station;

transmitting, by the manual pull station, a signal to the controller; and activating, by the controller, the fire alarm device to generate the first alarm upon receiving the signal from the manual pull station.

18. The indication method of claim 16, wherein the indication system further includes a plurality of disable switches, and wherein each energy storage system is associated with a corresponding disable switch, the method further comprising preventing a release of the fire suppressing agent into the detected energy storage system upon operation of the corresponding disable switch from the plurality of disable switches by a user.

19. The indication method of claim 16, wherein the controller is communicably coupled with a fire department and/or a back office, the method further comprising transmitting a notification to the fire department and/or the back office upon receiving at least one of the first information, the second information, the third information, and/or the fourth information from at least one of the plurality of energy storage systems.

20. The indication method of claim 16 further comprising maintaining, via a heater of the indication system, a temperature within a housing of the indication system within a predefined temperature range, wherein the fire alarm device, the discharge alarm device, the annunciation panel, and the controller are at least partially disposed within the housing.

* * * * *